United States Patent Office 3,176,028
Patented Mar. 30, 1965

3,176,028
20-(ALIPHATIC HYDROCARBONOXY)- AND 20-(SUBSTITUTED ALIPHATIC HYDROCARBONOXY) PREGNANE DERIVATIVES
Alexander D. Cross, Mexico City, Mexico, assignor to Syntex Corporation, Panama, Panama, a corporation of Panama
No Drawing. Filed May 24, 1963, Ser. No. 282,846
27 Claims. (Cl. 260—397.1)

This invention relates to novel cyclopentanopolyhydrophenanthrene derivatives and to processes for their preparation.

More particularly, this invention relates to novel 20-(aliphatic hydrocarbonoxy)- and 20-(substituted aliphatic hydrocarbonoxy) pregnane derivatives represented by the general formulas:

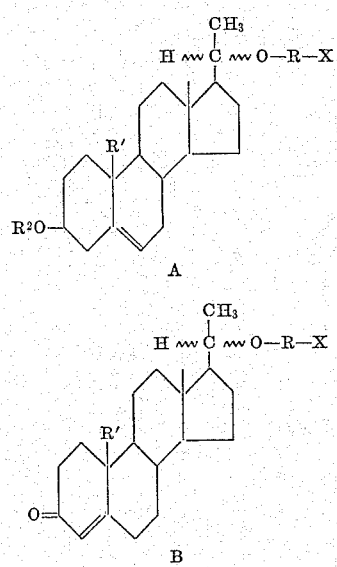

In these formulas R represents a saturated or unsaturated, straight or branched chain aliphatic hydrocarbon residue containing from 1 to 7 carbon atoms, inclusive, such as ethylene, i.e., —$CH_2$—$CH_2$—, propylene, butylene, but-1-enylene, but-1-inylene, 2-methylbutylene, 2,3-dimethylbutylene, 2-methyl-but-2-enylene, 2,3-dimethylbut-2-enylene, 2,3-dimethylpentylene, 2,3-dimethylpent-2-enylene, hexamethylene, and the like; $R^1$ represents hydrogen or methyl; $R^2$ represents hydrogen or an acyl group, and X, which is substituted on a primary, secondary or tertiary carbon atom of the group R, represents hydrogen [in this case R and X taken together can represent, for example, a 3'-methylbutyl(isoamyl) or 3'-methylbut-2'-enyl radical], a halogen, e.g., fluorine or chlorine, an N,N-dialkylamino group, preferably an N,N-di-(lower)alkylamino group such as N,N-dimethylamino and the like, a hydroxyl group (in this case R and X taken together can represent, for example, a 3'-methyl-3'-hydroxybutyl radical), an acyl group, a cyano group, or a carboxyl group.

The symbol ξ at the 20-position in the above formulas and in those that follow signifies that the hydrogen, aliphatic hydrocarbonoxy and substituted aliphatic hydrocarbonoxy substituents at the 20-position can be in either the α- or the β-configuration.

The acyl and acyloxy groups referred to hereinabove are derived from carboxylic acids, preferably hydrocarbon carboxylic acids, of less than 12 carbon atoms. These acids can be saturated or unsaturated, of straight, branched, cyclic or cyclic-aliphatic chain, or aromatic, and may be substituted with functional groups such as hydroxyl groups, alkoxy groups containing up to 5 carbon atoms, acyloxy groups containing up to 12 carbon atoms, nitro groups, amino groups and halogens. Typical ester groups are the acetate, trimethylacetate, t-butyl-acetate, amonoacetate, phenyoxyacetate, propionate, β-chloropropionate, cyclopentylpropionate, enanthate, and benzoate.

The novel 20-(aliphatic hydrocarbonoxy)- and 20-(substituted aliphatic hydrocarbonoxy) pregnenes represented by formulas A and B above are progestational agents, and in addition are of great utility in lowering blood cholesterol levels.

The compounds of the present invention can be obtained by the methods illustrated by the following sequence of reactions:

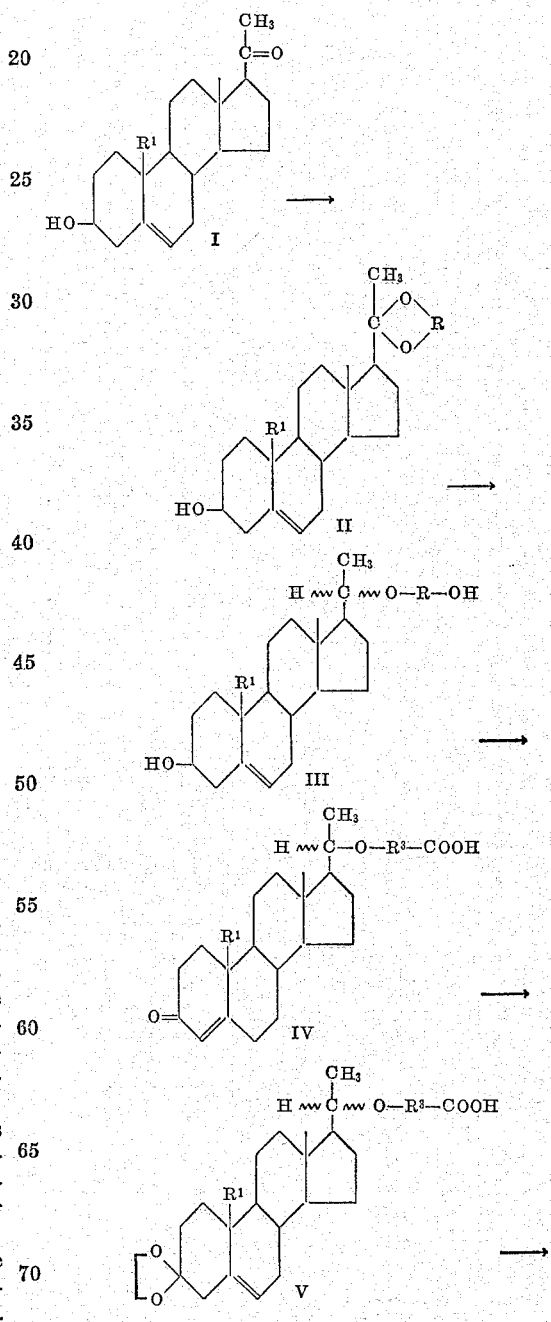

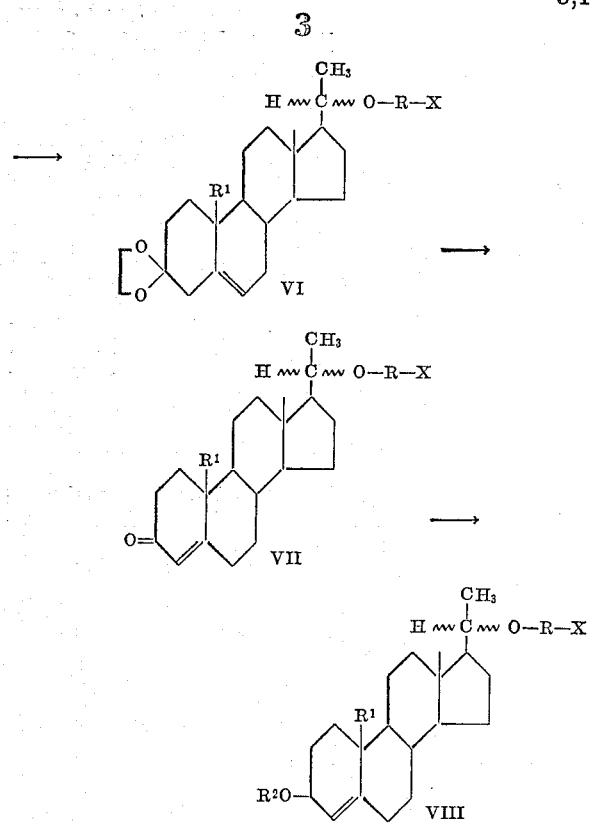

In the above formulas each of R, $R^1$, $R^2$ and X have the same meanings as set forth hereinabove for formulas A and B, and $R^3$ represents a saturated or unsaturated, straight or branched chain aliphatic hydrocarbon residue containing one less carbon atom than the group R in the preceding compound (III).

In practicing the methods outlined above, the starting material (I), i.e., pregnenolone or 19-norpregnenolone, is reacted with a dihydric alcohol, preferably an aliphatic hydrocarbon diol, of up to 7 carbon atoms, such as ethylene glycol, propylene glycol-1,2, propylene glycol-1,3, butanediol-1,3, butanediol-1,4, hexanediol-1,6, hexanediol-2,3, heptamethylene glycol, and the like, to yield the corresponding 20-ketal (II), e.g., 20-(cycloethylenedioxy)-pregnenolone, or the corresponding 19-nor compound. This reaction will generally be carried out in the presence of a strong acid, e.g., p-toluenesulfonic acid and the like, preferably in solution in an inert organic solvent such as benzene and the like, at reflux temperature, and will usually take about 12 hours, although longer or shorter reaction times coupled with lower or higher temperatures may be employed if desired.

The 20-ketal (II) is then treated with a cleaving agent, as described in my copending U.S. Patent Application Serial No. 282,848, filed on May 24, 1963, e.g., a double metal hydride containing at least one element of subgroup III–A of the Periodic Chart [as set forth at pages 56 and 57 of "Lange's Handbook of Chemistry," Ninth Edition (Sandusky, Ohio; Handbook Publishers, Inc., 1956)], such as lithium aluminum hydride, potassium aluminum hydride, magnesium aluminum hydride, lithium gallium hydride, zinc aluminum hydride, sodium borohydride, potassium borohydride, aluminum borohydride, and the like, together with a Lewis acid containing no active hydrogen, and preferably a Lewis acid containing an element having an atomic number of 26 to 28 inclusive or an element of subgroup III–A of the Periodic Chart, such as ferric chloride, boron trifluoride, boron trichloride, aluminum fluoride, aluminum chloride, aluminum bromide, gallium chloride, and the like, to yield the corresponding 20α- and 20β-(hydroxy aliphatic hydrocarbonoxy)-Δ5-pregnenes or their 19-nor derivatives (III), e.g., 20α- and 20β-(2'-hydroxyethoxy)-Δ5-pregnen-3β-ol being obtained by reacting 20-(cycloethylenedioxy)-Δ5-pregnen-3β-ol with lithium aluminum hydride and aluminum chloride in tetrahydrofuran. This reaction will generally be carried out in an organic solvent having an ether function in its molecule, e.g., diethyl ether, tetrahydrofuran and the like, at a temperature ranging from room temperature (about 25° C.) or lower to reflux temperature or above for a period of time ranging anywhere from about 30 minutes to about 24 hours. The 20α- and 20β-derivatives can be separated by conventional chromatographic methods.

These 20α- and 20β-(hydroxy aliphatic hydrocarbonoxy)-Δ5-pregnenes and 19-nor pregnenes, e.g., 20α- and 20β-(2'-hydroxyethoxy)-Δ5-pregnen-3β-ol, when treated under conventional Oppenauer conditions followed by Jones' oxidation (e.g., with 8N chromic acid), yield the corresponding 20-(carboxy aliphatic hydrocarbonoxy)-Δ4-pregnen-3-ones and their 19-nor derivatives (IV) having one less carbon atom in the group R than the preceding compounds, e.g., 20α- and 20β-(carboxymethoxy)-Δ4-pregnen-3-one.

The 3-keto group in these carboxy derivatives (IV) is then protected by ketalization, e.g., using ethylene glycol in the presence of p-toluenesulfonic acid. Thus, 20α- and 20β-(carboxymethoxy)-Δ4-pregnene-3-one and the corresponding 19-nor compounds yield 3-(cycloethylenedioxy)-20α- and 20β-(carboxymethoxy)-Δ5-pregnene and the corresponding 19-nor compounds (V).

Reduction of these 3-ketals (V), e.g., with lithium aluminum hydride, affords the corresponding 3-ketals of the 20α- and 20β-(hydroxy aliphatic hydrocarbonoxy)-Δ5-pregnenes and their 19-nor derivatives (VI; X=OH), e.g., 3-(cycloethylenedioxy)-20α- and 20β-(2'-hydroxyethoxy)-Δ5-pregnene.

These 3-ketals of the 20α- and 20β-(hydroxy aliphatic hydrocarbonoxy)-Δ5-pregnenes and their 19-nor derivatives, when tosylated by known procedures, e.g., using tosyl chloride in pyridine, yield the corresponding 3-ketals of 20-(tosyloxy aliphatic hydrocarbonoxy)-Δ5-pregnenes and their 19-nor derivatives, e.g., 3-(cycloethylenedioxy)-20α- and 20β-(2'-tosyloxyethoxy)-Δ5-pregnene.

These tosylated intermediates, when heated at reflux temperature with an alkali metal halide, such as lithium chloride, potassium fluoride, potassium chloride, sodium chloride, and the like, preferably in an inert organic solvent such as dimethylformamide and the like, yield the corresponding 3-ketals of the 20-(halo aliphatic hydrocarbonoxy)-Δ5-pregnenes and their 19-nor derivatives (VI; X=halogen), e.g., 3-(cycloethylenedioxy)-20α- and 20β-(2'-fluoroethoxy)-Δ5-pregnene being obtained by reacting 3-(cycloethylenedioxy)-20α- and 20β-(2'-tosloxyethoxy)-Δ5-pregnene with potassium fluoride.

Similarly, treatment of the 20-(tosyloxy aliphatic hydrocarbonoxy)-pregnene and 19-nor-pregnene intermediates with a dialkyl amine, preferably a di(lower)alkyl amine such as dimethyl amine, diethyl amine, methyl propyl amine, and the like, preferably in solution in an inert organic solvent such as dioxane and the like, gives the corresponding 3-ketals of the 20-(N,N-dialkylamino aliphatic hydrocarbonoxy)-Δ5-pregnenes and their 19-nor derivatives [VI; X=N(alkyl)$_2$], e.g., 3-(cycloethylenedioxy)-20α- and 20β-[2'-(N,N-dimethylamino)-ethoxy]-Δ5-pregnene.

Treatment of the tosyloxy intermediates with an alkali metal cyanide, e.g., sodium cyanide, potassium cyanide, and the like, preferably in solution in an inert organic solvent such as acetonitrile and the like, produces the corresponding 3-ketals of the 20-(cyano aliphatic hydrocarbonoxy)-Δ5-pregnenes and their 19-nor derivatives (VI; X=CN), e.g., 3-(cycloethylenedioxy)-20α- and 20β-(2'-cyanoethoxy)-Δ5-pregnene.

These 20-(cyano aliphatic hydrocarbonoxy) compounds, when subjected to conventional basic hydrolysis, e.g., using sodium hydroxide or the like, afford the corresponding 3-ketals of the 20-(carboxy aliphatic hydrocarbonoxy)-Δ⁵-pregnenes and their 19-nor derivatives (VI; X=COOH), e.g., 3-(cycloethylenedioxy)-20α- and 20β-(2′-carboxyethoxy)-Δ⁵-pregnene being obtained by hydrolyzing the cyano groups in 3-(cycloethylenedioxy)-20α- and 20β-(2′-cyanoethoxy)-Δ⁵-pregnene.

Treatment of the 20-(carboxy aliphatic hydrocarbonoxy) compounds with a lower alkyl magnesium halide, such as methyl magnesium bromide and the like, under conventional conditions, produces the corresponding 3-ketals of the 20-(n′-hydroxy-n′-alkyl aliphatic hydrocarbonoxy)-Δ⁵-pregnenes and their 19-nor derivatives (VI; X=OH), n′ being the carbon atom of the aliphatic hydrocarbonoxy group to which the hydroxy and alkyl groups are attached, e.g., 3-(cycloethylenedioxy)-20α- and 20β-(3′-hydroxy-3′-methylbutoxy)-Δ⁵-pregnene being the products resulting from the reaction of 3-(cycloethylenedioxy)-20α- and 20β-(2′-carboxy-ethoxy)-Δ⁵-pregnene with methyl magnesium bromide. Dehydration of these 20-(n′-hydroxy-n′-alkyl aliphatic hydrocarbonoxy) intermediates, for example, by treatment with mesyl chloride in dimethylformamide-pyridine at about 80° C. for about 3 hours, results in the corresponding 3-ketals of the 20-(unsaturated aliphatic hydrocarbonoxy)-Δ⁵-pregnenes and their 19-nor derivatives (VI; X=H, R is unsaturated), e.g., 3-(cycloethylenedioxy)-20α- and 20β-(3′-hydroxy-3′-methylbutoxy)-Δ⁵-pregnene yielding, on dehydration, 3-(cycloethylenedioxy)-20α- and 20β-(3′-methylbut-2′-enyloxy)-Δ⁵-pregnene. Catalytic hydrogenation of these 17-(unsaturated aliphatic hydrocarbonoxy)-Δ⁵-pregnenes and the corresponding 19-nor compounds, e.g., at atmospheric pressure using a 5% palladium-on-charcoal catalyst, results in the corresponding 3-ketals of the 20α- and 20β-(saturated aliphatic hydrocarbonoxy)-Δ⁵-pregnenes and their 19-nor derivatives (VI; X=H, R is saturated), e.g., 3-(cycloethylenedioxy)-20α- and 20β-(3′-methylbut-2′-enyloxy)-Δ⁵-pregnene yield, on catalytic hydrogenation, 3-(cycloethylenedioxy)-20α- and 20β-(isoamyloxy)-Δ⁵-pregnene.

All of the aforementioned 3-ketal-Δ⁵-pregnene derivatives (VI) can be converted into the corresponding Δ⁴-pregnen-3-ones (VII) by conventional acid hydrolysis, e.g., using hydrochloric acid.

Treatment of the Δ⁴-pregnen-3-ones (VII) with an organic acid anhydride, preferably mixed with the corresponding acid chloride, e.g., a mixture of acetic anhydride and acetyl chloride, at reflux temperature, gives the corresponding enol acylates which, upon reduction with an alkali metal borohydride, e.g., sodium borohydride and the like, in an ethanol-tetrahydrofuran solution for about 3 hours at about 0° C. to 5° C., followed by refluxing of the resulting reaction product with a base, such as sodium hydroxide and the like, afford the corresponding 20-(aliphatic hydrocarbonoxy) and -(substituted aliphatic hydrocarbonoxy)-Δ⁵-pregnen-3β-ols and their 19-nor derivatives (VIII; R²=H).

The compounds of the present invention having a primary or a secondary hydroxyl group are preferably acylated by reaction with a suitable acid chloride or anhydride in pyridine in the manner well known in the art, while the compounds of the present invention having a tertiary hydroxyl group are preferably esterified by reaction with a suitable acid anhydride in pyridine, in the presence of an acid catalyst such as p-toluenesulfonic acid and the like, again in the manner well known in the art.

The following specific examples serve to illustrate but are not intended to limit the scope of the present invention.

Example I

A mixture of 5 g. of pregneneolone, 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over anhydrous sodium sulfate and evaporated to dryness. The residue crystallized from acetone-hexane to give 20-cycloethylenedioxy-Δ⁵-pregnen-3β-ol (Compound No. 1).

Example II

A solution of 1 g. of compound No. 1 in 50 cc. of tetrahydrofuran was added over a 30 minute period to a stirred suspension of 1 g. of lithium aluminum hydride and 5 g. of aluminum trichloride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and throughly washed with hot ethyl acetate, the combined organic solutions upon evaporation yielded a crude material, which, after chromatography on alumina and crystallization of the solid fractions from acetone-hexane yielded 20β-(2′-hydroxyethoxy)-Δ⁵-pregnen-3β-ol (Cpd. No. 2) and 20α-(2′-hydroxyethoxy)-Δ⁵-pregnen-3β-ol (Cpd. No. 3).

Example III

A solution of 1 g. of compound No. 2 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 45 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 20β-(2′-oxoethoxy)-Δ⁴-pregnen-3-one (Cpd. No. 4).

Example IV

A solution of 1 g. of compound No. 4 in 10 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 20β-(carboxymethoxy)-Δ⁴-pregnen-3-one (Cpd. No. 5).

Example V

The compound No. 5 was treated according to Example I, thus yielding: 3-cycloethylenedioxy-20β-(carboxymethoxy)-Δ⁵-pregnene (Cpd. No. 6).

Example VI

A solution of 1 g. of compound No. 6 in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was purified by crystallization from acetone-hexane thus giving 3-cycloethylenedioxy-20β-(2′-hydroxyethoxy)-Δ⁵-pregnene (Cpd. No. 7).

Example VII

A solution of 1 g. of compound No. 7 in 5 cc. of pyridine was treated with 0.5 g. of tosyl chloride and kept at room temperature for 24 hours; it was then diluted with water and the precipitate separated by filtration, thus giving 3 - cycloethylenedioxy-20β - (2' - tosyloxyethoxy)-Δ⁵-pregnene (Cpd. No. 8).

*Example VIII*

A suspension of 10 g. of potassium fluoride in 50 cc. of dimethyl formamide was heated to boiling and then a solution of 2 g. of Compound No. 8, in 10 cc. of dimethyl formamide was added. The mixture was refluxed for 5 hours, cooled and poured into water. The formed precipitate was filtered off and crystallized to give 3-cycloethylenedioxy-20β-(2'-fluoroethoxy)-Δ⁵-pregnene (Cpd. No. 9).

*Example IX*

The compound No. 8 was treated according to Example VIII, except that potassium chloride was used instead of potassium fluoride, thus yielding 3-cycloethylenedioxy-20β-(2'-chloroethoxy)-Δ⁵-pregnene (Cpd. No. 10).

*Example X*

A solution of 1 g. of Compound No. 8 in 50 cc. of dioxane was treated with a constant stream of dimethylamine during 48 hours. Thereafter, the solution was boiled under reflux for 30 minutes and poured into water, thus affording a precipitate which was filtered off, dried and recrystallized from methanol-benzene, thus furnishing 3-cycloethylenedioxy-20β-(2'-[N,N - dimethylamino]-ethoxy)-Δ⁵-pregnene (Cpd. No. 11).

*Example XI*

A mixture of 1 g. of Compound No. 8, 1 g. of potassium cyanide and 50 cc. of acetonitrile was kept at 100° C. for 3 hours. The mixture was then poured into water, and the formed precipitate filtered off, dried and crystallized from acetone-hexane, thus yielding 3-cycloethylenedioxy-20β-(2'-cyanoethoxy)-Δ⁵-pregnene (Cpd. No. 12).

*Example XII*

A mixture of 1 g. of Compound No. 12, and 50 cc. of a 5% solution of sodium hydroxide in methanol, was refluxed during 4 hours, then cooled, neutralized with acetic acid and diluted with water. The formed precipitate was collected by filtration and recrystallized from acetone-hexane, thus yielding 3-cycloethylenedioxy-20β-(2'-carboxyethoxy)-Δ⁵-pregnene (Cpd. No. 13).

*Example XIII*

A solution of 5 g. of Compound No. 13 in 250 cc. of thiophene-free benzene was treated with 55 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 3 - cycloethylenedioxy-20β-(3'-hydroxy-3'-methyl-butoxy)-Δ⁵-pregnene (Cpd. No. 14).

*Example XIV*

1 g. of Compound No. 14 was dissolved with slow heating in 12.5 cc. of dimethyl-formamide, the mixture was cooled, 0.42 g. of mesyl chloride and 0.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 3 - cycloethylenedioxy - 20β - (3'-methyl-but-2'-enyloxy)-Δ⁵-pregnene (Cpd. No. 15).

*Example XV*

A suspension of 0.5 g. of 5% palladium on charcoal catalyst in 50 cc. of methanol was hydrogenated for 30 minutes. A solution of 2 g. of Compound No. 15 in 200 cc. of methanol was added to the catalyst and stirred under a hydrogen atmosphere until one mol equivalent of hydrogen was taken up. After removal of the catalyst by filtration the solution was evaporated and the crude residue was purified by crystallization from methylene chloride-hexane, thus giving 3-cycloethylenedioxy-20β-(isoamyloxy)-Δ⁵-pregnene (Cpd. No. 16).

*Example VXI*

A solution of 500 mg. of compound No. 7 in 25 cc. of acetone was treated with 0.1 cc. of concentrated hydrochloric acid and the mixture kept at room temperature overnight. It was then poured into water, extracted with methylene chloride and the organic extract washed with water to neutral, dried over anhydrous sodium sulfate and evaporated to dryness. Crystallization from acetone-hexane gave 20β-(2'-hydroxyethoxy)- Δ⁴-pregnen-3-one (Cpd. No. 17).

The compounds Nos. 9, 10, 13, 14, 15 and 16 were treated according to the same procedure, thus affording respectively:

Compound No.
 (18) 20β-(2'-fluoroethoxy)-Δ⁴-pregnen-3-one.
 (19) 20β-(2'-chloroethoxy)-Δ⁴-pregnen-3-one.
 (20) 20β-(2'-carboxyethoxy)-Δ⁴-pregnen-3-one.
 (21) 20β-(3'-hydroxy-3'-methyl-butoxy)-Δ⁴-pregnen-3-one.
 (22) 20β-(3'-methyl-but-2'-enyloxy)-Δ⁴-Δ⁴-pregnen-3-one.
 (23) 20β-(isoamyloxy)-Δ⁴-pregnen-3-one.

*Example XVII*

A solution of 5 g. of compound No. 17 in 50 cc. of acetic anhydride and 50 cc. of acetyl chloride was boiled for 4 hours under an atmosphere of nitrogen. The reaction mixture then was distilled almost to dryness, cooled, diluted with ether and the organic extract washed with water, then with 5% sodium bicarbonate solution and finally with water. There was thus obtained 3-acetoxy-20β-(2'-acetoxy ethoxy)-Δ³,⁵-pregnadiene (Cpd. No. 24).

A solution of 5 g. of compound No. 24 in a mixture of 100 cc. of 95% ethanol and 35 cc. of tetrahydrofuran was cooled to 10° C. and added dropwise, with occasional stirring over a 1 hour period, to a cold solution of 6 g. of sodium borohydride in 50 cc. of 80% ethanol, the reaction temperature not being allowed to exceed 5° C. After completion of addition, the solution was kept at 0–5° C. for 2 hours further; then 200 cc. of 10% sodium hydroxide was added and the solution boiled for 15 minutes. Most of the solvent was removed in vacuo, the residue neutralized with 20% hydrochloride acid and the crystalline precipitate collected and washed. Recrystallization of the crude material from acetone furnished 20β-(2'-hydroxyethoxy)-Δ⁵-pregnen-3β-ol (Cpd. No. 25).

The compounds Nos. 18 to 23, inclusive, were treated according to the latter procedures, thus affording as final products:

Compound No.
 (26) 20β-(2'-fluoroethoxy)-Δ⁵-pregnen-3β-ol.
 (27) 20β-(2'-chloroethoxy)-Δ⁵-pregnen-3β-ol.
 (28) 20β-(2'-carboxyethoxy)-Δ⁵-pregnen-3β-ol.
 (29) 20β-(3'-hydroxy-3'-methylbutoxy)-Δ⁵-pregnen-3β-ol.
 (30) 20β-(3'-methyl-but-2'-enyloxy)-Δ⁵-pregnen-3β-ol.
 (31) 20β-(isoamyloxy)-Δ⁵-pregnen-3β-ol.

Example XVIII

A solution of 500 mg. of compound No. 11 in 25 cc. of acetone was treated with 0.1 cc. of concentrated hydrochloric acid and the mixture kept at room temperature overnight. It was then poured into water containing 250 mg. of sodium hydroxide, extracted with methylene chloride and the organic extract washed with water to neutral, dried over anhydrous sodium sulfate and evaporated to dryness. Crystallization from acetone-hexane gave 20β-(2'-[N,N-dimethylamino]-ethoxy)-$\Delta^4$-pregnen-3-one (Cpd. No. 32).

Example XIX

The compound No. 32 was treated according to Example XVII, thus furnishing as final product: 20β-(2'-[N,N-dimethylamino]-$\Delta^5$-pregnen-3β-ol (Cpd. No. 33.).

Example XX

The compound No. 3 was successively treated according to Examples III, IV, V, VI and VII, thus yielding respectively:

Compound No.
(34) 20α-(2'-oxoethoxy)-$\Delta^4$-pregnen-3-one.
(35) 20α-(carboxymethoxy)-$\Delta^4$-pregnen-3-one.
(36) 3-cycloethylenedioxy-20α-(carboxymethoxy)-$\Delta^5$-pregnene.
(37) 3-cycloethylenedioxy-20α-(2'-hydroxyethoxy)-$\Delta^5$-pregnene.
(38) 3-cycloethylenedioxy-20α-(2'-tosyloxyethoxy)-$\Delta^5$-pregnene.

Example XXI

The compound No. 38 was treated according to Examples VIII, IX, X and XI, thus yielding respectively:

Compound No.
(39) 3-cycloethylenedioxy-20α-(2'-fluoroethoxy)-$\Delta^5$-pregnene.
(40) 3-cycloethylenedioxy-20α-(2'-chloroethoxy)-$\Delta^5$-pregnene.
(41) 3-cycloethylenedioxy-20α-(2'-[N,N-dimethylamino]-ethoxy)-$\Delta^5$-pregnene.
(42) 3-cycloethylenedioxy-20α-(2'-cyanoethoxy)-$\Delta^5$-pregnene.

Example XXII

The compound No. 42 was treated, successively in accordance with Examples XII, XIII, XIV and XV, thus yielding respectively:

Compound No.
(43) 3-cycloethylenedioxy-20α-(2'-carboxyethoxy)-$\Delta^5$-pregnene.
(44) 3-cycloethylenedioxy-20α-(3'-hydroxy-3'-methylbutoxy)-$\Delta^5$-pregnene.
(45) 3-cycloethylenedioxy-20α-(3'-methyl-but-2'-enyloxy)-$\Delta^5$-pregnene.
(46) 3-cycloethylenedioxy-20α-isoamyloxy-$\Delta^5$-pregnene.

Example XXIII

The compounds Nos. 37, 39, 40, 43, 44, 45 and 46 were treated according to Example XVI, thus yielding respectively:

Compound No.
(47) 20α-(2'-hydroxyethoxy)-$\Delta^4$-pregnen-3-one.
(48) 20α-(2'-fluoroethoxy)-$\Delta^4$-pregnen-3-one.
(49) 20α-(2'-chloroethoxy)-$\Delta^4$-pregnen-3-one.
(50) 20α-(2'-carboxyethoxy)-$\Delta^4$-pregnen-3-one.
(51) 20α-(3'-hydroxy-3'-methyl-butoxy)-$\Delta^4$-pregnen-3-one.
(52) 20α-(3'-methyl-but-2'-enyloxy)-$\Delta^4$-pregnen-3-one.
(53) 20α-(isoamyloxy)-$\Delta^4$-pregnen-3-one.

Example XXIV

The compounds Nos. 47 to 53, inclusive, were treated according to the procedures described in Example XVII thus affording, respectively, as final products:

Compound No.
(54) 20α-(2'-hydroxyethoxy)-$\Delta^5$-pregnen-3β-ol.
(55) 20α-(2'-fluoroethoxy)-$\Delta^5$-pregnen-3β-ol.
(56) 20α-(2'-chloroethoxy)-$\Delta^5$-pregnen-3β-ol.
(57) 20α-(2'-carboxyethoxy)-$\Delta^5$-pregnen-3β-ol.
(58) 20α-(3'-hydroxy-3'-methylbutoxy)-$\Delta^5$-pregnen-3β-ol.
(59) 20α-(3'-methyl-but-2'-enyloxy)-$\Delta^5$-pregnen-3β-ol.
(60) 20α-(isoamyloxy)-$\Delta^5$-pregnen-3β-ol.

Example XXV

The compound No. 41 was treated successively according to Examples XVIII and XIX, thus yielding respectively: 20α-(2'-[N,N-dimethylamino]-ethoxy)-$\Delta^4$-pregnen-3-one (Cpd. No. 61) and 20α-(2'[N,N-dimethylamino]-ethoxy)-$\Delta^5$-pregnen-3β-ol (Cpd. No. 62).

Example XXVI

The known 19-nor-pregnenolone (obtained according to U.S. Pat. No. 3,071,581) was treated according to Example I, thus yielding 20-cycloethylene-dioxy-19-nor-$\Delta^5$-pregnen-3β-ol (Cpd. No. 63) which upon treatment by the procedure of Example II, yielded 20β-(2'-hydroxyethoxy)-19-nor-$\Delta^5$-pregnen-3β-ol (Cpd. No. 64) and 20α-(2'-hydroxyethoxy)-19-nor-$\Delta^5$-pregnen-3β-ol (Cpd. No. 65).

Example XXVII

The compound No. 64 was successively treated according to Examples III, IV, V, VI and VII, thus yielding respectively:

Compound No.
(66) 20β-(2'-oxoethoxy)-19-nor-$\Delta^4$-pregnen-3-one.
(67) 20β-(carboxymethoxy)-19-nor-$\Delta^4$-pregnen-3-one.
(68) 3-cycloethylenedioxy-20β-(carboxymethoxy)-19-nor-$\Delta^5$-pregnene.
(69) 3-cycloethylenedioxy-20β-(2'-hydroxyethoxy)-19-nor-$\Delta^5$-pregnene.
(70) 3-cycloethylenedioxy-20β-(2'-tosyloxyethoxy)-19-nor-$\Delta^5$-pregnene.

Example XXVIII

The compound No. 70 was treated according to Examples VIII, IX, X and XI, thus yielding respectively:

Compound No.
(71) 3-cycloethylenedioxy-20β-(2'-fluoroethoxy)-19-nor-$\Delta^5$-pregnene.
(72) 3-cycloethylenedioxy-20β-(2'-chloroethoxy)-19-nor-$\Delta^5$-pregnene.
(73) 3-cycloethylenedioxy-20β-(2'-[N,N-dimethylamino]-ethoxy)-19-nor-$\Delta^5$-pregnene.
(74) 3-cycloethylenedioxy-20β-(2'-cyanoethoxy)-19-nor-$\Delta^5$-pregnene.

Example XXIX

The compound No. 74 was treated, successively in accordance with Examples XII, XIII, XIV and XV, thus yielding respectively:

Compound No.
(75) 3-cycloethylenedioxy-20β-(2'-carboxyethoxy)-19-nor-$\Delta^5$-pregnene.
(76) 3-cycloethylenedioxy-20β-(3'-hydroxy-3'-methylbutoxy)-19-nor-$\Delta^5$-pregnene.
(77) 3-cycloethylenedioxy-20β-(3'-methyl-but-2'-enyloxy)-19-nor-$\Delta^5$-pregnene.
(78) 3-cycloethylenedioxy-20β-(isoamyloxy)-19-nor-$\Delta^5$-pregnene.

Example XXX

The compounds Nos. 69, 71, 72, 75, 76, 77 and 78 were treated according to Example XVI, thus yielding respectively:

Compound No.
- (79) 20β-(2'-hydroxyethoxy)-19-nor-$\Delta^4$-pregnen-3-one.
- (80) 20β-(2'-fluoroethoxy)-19-nor-$\Delta^4$-pregnen-3-one.
- (81) 20β-(2'-chloroethoxy)-19-nor-$\Delta^4$-pregnen-3-one.
- (82) 20β-(2'-carboxyethoxy)-19-nor-$\Delta^4$-pregnen-3-one.
- (83) 20β-(3'-hydroxy-3'-methylbutoxy)-19-nor-$\Delta^4$-pregnen-3-one.
- (84) 20β-(3'-methyl-but-2'-enyloxy)-19-nor-$\Delta^4$-pregnen-3-one.
- (85) 20β-(isoamyloxy)-19-nor-$\Delta^4$-pregnen-3-one.

Example XXXI

The compounds Nos. 79 to 85, inclusive, were treated according to the procedures described in Example XVII thus affording, respectively, as final products:

Compound No.
- (86) 20β-(2'-hydroxyethoxy)-19-nor-$\Delta^5$-pregnen-3β-ol.
- (87) 20β-(2'-fluoroethoxy)-19-nor-$\Delta^5$-pregnen-3β-ol.
- (88) 20β-(2'-chloroethoxy)-19-nor-$\Delta^5$-pregnen-3β-ol.
- (89) 20β-(2'-carboxyethoxy)-19-nor-$\Delta^5$-pregnen-3β-ol.
- (90) 20β-(3'-hydroxy-3'-methylbutoxy)-19-nor-$\Delta^5$-pregnen-3β-ol.
- (91) 20β-(3'-methyl-but-2'-enyloxy)-19-nor-$\Delta^5$-pregnen-3β-ol.
- (92) 20β-(isoamyloxy)-19-nor-$\Delta^5$-pregnen-3β-ol.

Example XXXII

The compound No. 73 was treated, successively according to Examples XVIII and XIX, thus yielding respectively: 20β-(2'-[N,N-dimethylamino]-ethoxy)-19-nor-$\Delta^4$-pregnen-3-one (Cpd. No. 93) and 20β-(2'-[N,N-dimethylamino]-ethoxy)-19-nor-$\Delta^5$-pregnen-3β-ol (Cpd. No. 94).

Example XXXIII

The compound No. 65 was successively treated according to Examples III, IV, V, VI and VII, thus yielding respectively.

Compound No.
- (95) 20α-(2'-oxoethoxy)-19-nor-$\Delta^4$-pregnen-3-one.
- (96) 20α-(carboxymethoxy)-19-nor-$\Delta^4$-pregnen-3-one.
- (97) 3-cycloethylenedioxy-20α-(carboxymethoxy)-19-nor-$\Delta^5$-pregnene.
- (98) 3-cycloethylenedioxy-20α-(2'-hydroxyethoxy)-19-nor-$\Delta^5$-pregnene.
- (99) 3-cycloethylenedioxy-20α-(2'-tosyloxyethoxy)-19-nor-$\Delta^5$-pregnene.

Example XXXIV

The compound No. 99 was treated according to Examples VIII, IX, X and XI, thus yielding respectively:

Compound No.
- (100) 3-cycloethylenedioxy-20α-(2'-fluoroethoxy)-19-nor-$\Delta^5$-pregnene.
- (101) 3-cycloethylenedioxy-20α-(2'-chloroethoxy)-19-nor-$\Delta^5$-pregnene.
- (102) 3-cycloethylenedioxy-20α-(2'-[N,N-dimethylamino]-ethoxy)-19-nor-$\Delta^5$-pregnene.
- (103) 3-cycloethylenedioxy-20α-(2'-cyanoethoxy)-19-nor-$\Delta^5$-pregnene.

Example XXXV

The compound No. 103 was treated, successively in accordance with Examples XII, XIII, XIV, and XV, thus yielding respectively:

Compound No.
- (104) 3-cycloethylenedioxy-20α-(2'-carboxyethoxy)-19-nor-$\Delta^5$-pregnene.
- (105) 3-cycloethylenedioxy-20α-(3'-hydroxy-3'-methylbutoxy)-19-nor-$\Delta^5$-pregnene.
- (106) 3-cycloethylenedioxy-20α-(3'-methyl-but-2'-enyloxy)-19-nor-$\Delta^5$-pregnene.
- (107) 3-cycloethylenedioxy-20α-(isoamyloxy)-19-nor-$\Delta^5$-pregnene.

Example XXXVI

The compounds Nos. 98, 100, 101, 104, 105, 106 and 107 were treated according to Example XVI, thus yielding respectively:

Compound No.
- (108) 20α-(2'-hydroxyethoxy)-19-nor-$\Delta^4$-pregnen-3-one.
- (109) 20α-(2'-fluoroethoxy)-19-nor-$\Delta^4$-pregnen-3-one.
- (110) 20α-(2'-chloroethoxy)-19-nor-$\Delta^4$-pregnen-3-one.
- (111) 20α-(2'-carboxyethoxy)-19-nor-$\Delta^4$-pregnen-3-one.
- (112) 20α-(3'-hydroxy-3'-methyl-butoxy)-19-nor-$\Delta^4$-pregnen-3-one.
- (113) 20α-(3'-methyl-but-2'-enyloxy)-19-nor-$\Delta^4$-pregnen-3-one.
- (114) 20α-(isoamyloxy)-19-nor-$\Delta^4$-pregnen-3-one.

Example XXXVII

The compounds Nos. 108 to 114, inclusive, were treated according to the procedures described in Example XVII thus affording, respectively as final products:

Compound No.
- (115) 20α-(2'-hydroxyethoxy)-19-nor-$\Delta^5$-pregnen-3β-ol.
- (116) 20α-(2'-fluoroethoxy)-19-nor-$\Delta^5$-pregnen-3β-ol.
- (117) 20α-(2'-chloroethoxy)-19-nor-$\Delta^5$-pregnen-3β-ol.
- (118) 20α-(2'-carboxyethoxy)-19-nor-$\Delta^5$-pregnen-3β-ol.
- (119) 20α-(3'-hydroxy-3'-methylbutoxy)-19-nor-$\Delta^5$-pregnen-3β-ol.
- (120) 20α-(3'-methyl-but-2'-enyloxy)-19-nor-$\Delta^5$-pregnen-3β-ol.
- (121) 20α-(isoamyloxy)-19-nor-$\Delta^5$-pregnen-3β-ol.

Example XXXVIII

The compound No. 102 was treated successively according to Examples XVIII and XIX, thus yielding respectively: 20α-(2'-[N,N-dimethylamino]-ethoxy)-19-nor-$\Delta^4$-pregnen-3-one (Cpd. No. 122) and 20α-(2'-[N,N-dimethylamino]-ethoxy)-19-nor-$\Delta^5$-pregnen-3β-ol (Cpd. No. 123).

Example XXXIX

A mixture of 1 g. of 20β-(2'-hydroxyethoxy)-$\Delta^4$-pregnen-3-one (Cpd. No. 17) 4 cc. of pyridine and 2 cc. of acetic anhydride was kept at room temperature overnight, poured into ice water, the formed precipitate was filtered, washed with water and dried. Crystallization from acetone-hexane gave 20β-(2'-acetoxyethoxy)-$\Delta^4$-pregnen-3-one (Cpd. No. 124).

The compounds Nos. 25 to 31, inclusive, 54 to 60 inclusive, 86 to 92, inclusive and 115 to 121, inclusive were treated by the above procedure, thus affording respectively:

Compound No.
(125) 20β - (2'-acetoxyethoxy)-Δ⁵-pregnen-3β-ol acetate.
(126) 20β - (2'-fluoroethoxy)-Δ⁵-pregnen-3β-ol acetate.
(127) 20β - (2'-chloroethoxy)-Δ⁵-pregnen-3β-ol acetate.
(128) 20β - (2'-carboxyethoxy)-Δ⁵-pregnen-3β-ol acetate.
(129) 20β - (3'-hydroxy-3'-methylbutoxy)-Δ⁵-pregnen-3β-ol acetate.
(130) 20β - (3'-methyl-but-2'-enyloxy)-Δ⁵-pregnen-3β-ol acetate.
(131) 20β - (isoamyloxy)-Δ⁵-pregnen-3β-ol acetate.
(132) 20α - (2'-acetoxyethoxy)-Δ⁵-pregnen-3β-ol acetate.
(133) 20α - (2'-fluoroethoxy)-Δ⁵-pregnen-3β-ol acetate.
(134) 20α - (2'-chloroethoxy)-Δ⁵-pregnen-3β-ol acetate.
(135) 20α - (2'-carboxyethoxy)-Δ⁵-pregnen-3β-ol acetate.
(136) 20α - (3'-hydroxy-3'-methylbutoxy)-Δ⁵-pregnen-3β-ol acetate.
(137) 20α - (3'methyl-but-2'-enyloxy)-Δ⁵-pregnen-3β-ol acetate.
(138) 20α - (isoamyloxy)-Δ⁵-pregnen-3β-ol acetate.
(139) 20β - (2'-acetoxyethoxy)-19-nor-Δ⁵-pregnen-3β-ol acetate.
(140) 20β - (2'-fluoroethoxy)-19-nor-Δ⁵-pregnen-3β-ol acetate.
(141) 20β-(2'-chloroethoxy)-19-nor-Δ⁵-pregnen-3β-ol acetate.
(142) 20β-(2'-carboxyethoxy)-19-nor-Δ⁵-pregnen-3β-ol acetate.
(143) 20β-(3'-hydroxy-3'-methylbutoxy)-19-nor-Δ⁵-pregnen-3β-ol acetate.
(144) 20β-(3'-methyl-but-2'-enyloxy) - 19 - nor-Δ⁵-pregnen-3β-ol acetate.
(145) 20β-(isomyloxy)-19-nor - Δ⁵ - pregnen-3β-ol acetate.
(146) 20α-(2'-acetoxyethoxy)-19-nor-Δ⁵-pregnen-3β-ol acetate.
(147) 20α-(2'-fluoroethoxy)-19-nor-Δ⁵-pregnen-3β-ol acetate.
(148) 20α-(2'-chloroethoxy)-19-nor-Δ⁵-pregnen-3β-ol acetate.
(149) 20α-(2'-carboxyethoxy)-19-nor-Δ⁵-pregnen-3β-ol acetate.
(150) 20α-(3'-hydroxy-3'-methylbutoxy)-19-nor-Δ⁵-pregnen-3β-ol acetate.
(151) 20α-(3'-methyl-but-2'-enyloxy)-19-nor-Δ⁵-pregnen-3β-ol acetate.
(152) 20α-(isoamyloxy)-19-nor - Δ⁵ - pregnen-3β-ol acetate.

The compound Nos. 33, 47, 62, 79, 94, 108 and 123, were treated by the above procedure, thus furnishing respectively:

Compound No.
(153) 20β-(2'-[N,N-dimethylamino]ethoxy)-Δ⁵-pregnen-3β-ol acetate.
(154) 20α-(2'-acetoxyethoxy)-Δ⁴-pregnen-3-one.
(155) 20α-(2'-[N,N-dimethylamino]-ethoxy)-Δ⁵-pregnen-3β-ol acetate.
(156) 20β-(2'-acetoxyethoxy)-19-nor-Δ⁴-pregnen-3-one.
(157) 20β-(2'-[N,N-dimethylamino]-ethoxy)-19-nor-Δ⁵-pregnen-3β-ol acetate.
(158) 20α-(2'-acetoxyethoxy)-19-nor-Δ⁴-pregnen-3-one.
(159) 20α-(2'-[N,N-dimethylamino]-ethoxy)-19-nor-Δ⁵-pregnen-3β-ol acetate.

*Example XL*

The starting compounds of Example XXXIX were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclopentylpropionates of said starting compounds.

I claim:
1. A compound represented by the formula:

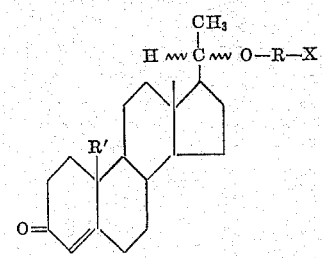

wherein R represents an aliphatic hydrocarbon residue containing from 1 to 7 carbon atoms, inclusive; $R^1$ is selected from the group consisting of hydrogen and methyl, and X is selected from the group consisting of hydrogen, halogen, an N,N-dialkylamino group, a hydroxyl group, a hydrocarbon carboxylic acyl group containing less than 12 carbon atoms, a cyano group and a carboxyl group.

2. 20-(2'-hydroxyethoxy)-Δ⁵-pregnen-3β-ol.
3. 20-(2'-fluoroethoxy)-Δ⁵-pregnen-3β-ol.
4. 20-(2'-chloroethoxy)-Δ⁵-pregnen-3β-ol.
5. 20-(2'-carboxyethoxy)-Δ⁵-pregnen-3β-ol.
6. 20-[2'-(N,N-dimethylamino)-ethoxy]-Δ⁵-pregnen-3β-ol.
7. 20-(2'-hydroxyethoxy)-19-nor-Δ⁵-pregnen-3β-ol.
8. 20-(2'-fluoroethoxy)-19-nor-Δ⁵-pregnen-3β-ol.
9. 20-(2'-chloroethoxy)-19-nor-Δ⁵-pregnen-3β-ol.
10. 20-(2'-carboxyethoxy)-19-nor-Δ⁵-pregnen-3β-ol.
11. 20-[2'-(N,N-dimethylamino)-ethoxy]-Δ⁵-pregnen-3β-ol.
12. 20-(2'-hydroxyethoxy)-Δ⁴-pregnen-3-one.
13. 20-(2'-fluoroethoxy)-Δ⁴-pregnen-3-one.
14. 20-(2'-chloroethoxy)-Δ⁴-pregnen-3-one.
15. 20-(2'-carboxyethoxy)-Δ⁴-pregnen-3-one.
16. 20-[2'-(N,N-dimethylamino)-ethoxy]-Δ⁴-pregnen-3-one.
17. 20-(2'-hydroxyethoxy)-19-nor-Δ⁴-pregnen-3-one.
18. 20-(2'-fluoroethoxy)-19-nor-Δ⁴-pregnen-3-one.
19. 20-(2'-cholorethoxy)-19-nor-Δ⁴-pregnen-3-one.
20. 20-(2'-carboxyethoxy)-19-nor-Δ⁴-pregnen-3-one.
21. 20-[2'-(N,N-dimethylamino)-ethoxy]-19-nor-Δ⁴-pregnen-3-one.

22. A compound represented by the formula:

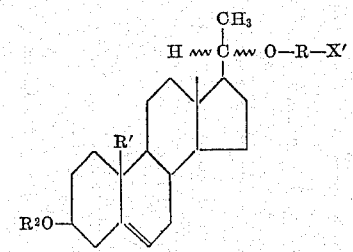

wherein R represents an aliphatic hydrocarbon residue containing from 1 to 7 carbon atoms, inclusive; R' is selected from the group consisting of hydrogen and methyl; $R^2$ is selected from the group consisting of hydrogen and an acyl group containing less than 12 carbon atoms, and X' represents halogen.

23. A compound represented by the formula:

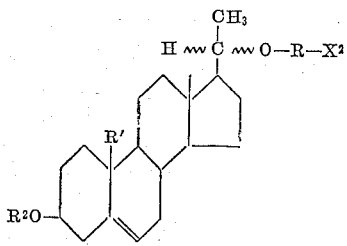

wherein R represents an aliphatic hydrocarbon residue containing from 1 to 7 carbon atoms, inclusive; R' is selected from the group consisting of hydrogen and methyl; $R^2$ is selected from the group consisting of hydrogen and an acyl group containing less than 12 carbon atoms, and $X^2$ represents an N,N-dialkylamino group.

24. A compound represented by the formula:

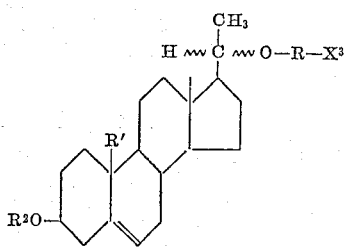

wherein R represents an aliphatic hydrocarbon residue containing from 1 to 7 carbon atoms, inclusive; R' is selected from the group consisting of hydrogen and methyl; $R^2$ is selected from the group consisting of hydrogen and an acyl group containing less than 12 carbon atoms, and $X^3$ represents a hydroxyl group.

25. A compound represented by the formula:

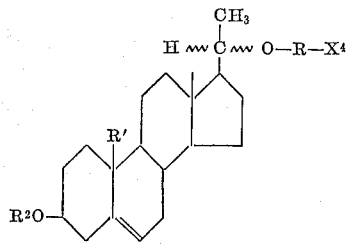

wherein R represents an aliphatic hydrocarbon residue containing from 1 to 7 carbon atoms, inclusive; R' is selected from the group consisting of hydrogen and methyl; $R^2$ is selected from the group consisting of hydrogen and an acyl group containing less than 12 carbon atoms, and $X^4$ represents a hydrocarbon carboxylic acyl group containing less than 12 carbon atoms.

26. A compound represented by the formula:

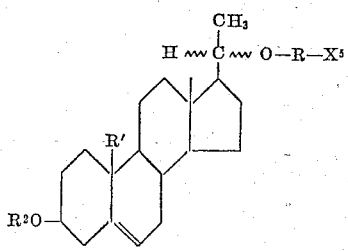

wherein R represents an aliphatic hydrocarbon residue containing from 1 to 7 carbon atoms, inclusive; R' is selected from the group consisting of hydrogen and methyl; $R^2$ is selected from the group consisting of hydrogen and an acyl group containing less than 12 carbon atoms, and $X^5$ represents a cyano group.

27. A compound represented by the formula:

wherein R represents an aliphatic hydrocarbon residue containing from 1 to 7 carbon atoms, inclusive; R' is selected from the group consisting of hydrogen and methyl; $R^2$ is selected from the group consisting of hydrogen and an acyl group containing less than 12 carbon atoms, and $X^6$ represents a carboxyl group.

References Cited in the file of this patent
UNITED STATES PATENTS
2,340,388    Inhoffen et al. ———————— Feb. 1, 1944